United States Patent

Furubayashi

[11] Patent Number: 5,615,842
[45] Date of Patent: Apr. 1, 1997

[54] FISHING REEL BRAKE DEVICE

[75] Inventor: Tadashi Furubayashi, Saitama, Japan

[73] Assignee: Daiwa Seiko, Inc., Tokyo, Japan

[21] Appl. No.: 386,803

[22] Filed: Feb. 6, 1995

[30] Foreign Application Priority Data

Feb. 22, 1994 [JP] Japan .................. 6-002338 U

[51] Int. Cl.$^6$ .................................. A01K 89/033
[52] U.S. Cl. ........................... 242/268; 242/319
[58] Field of Search ..................... 254/268, 269, 254/270, 271, 264, 319

[56] References Cited

U.S. PATENT DOCUMENTS 2,535,812  12/1950  Phillips .................. 254/269 X

FOREIGN PATENT DOCUMENTS 63-68774   5/1988   Japan .
3-83069    8/1991   Japan .
215251     9/1967   Sweden .................. 242/268

Primary Examiner—Daniel P. Stodola
Assistant Examiner—Emmanuel M. Marcelo
Attorney, Agent, or Firm—Longacre & White

[57] ABSTRACT

A brake device for a fishing reel in which an adjuster is supported without looseness, and is stably supported irrespective of the braking force, so that the braking force can adjusted finely. In the brake device, a nut member for depressing a brake member against a drive gear to frictionally couple the drive shaft to a handle shaft is non-rotatably and movably fitted in the adjuster which is rotatably supported by the reel main body. Intermediate members are respectively provided between the reel main body and the adjuster and between the adjuster and a handle to prevent the axial movement of the adjuster relative the handle shaft.

3 Claims, 4 Drawing Sheets

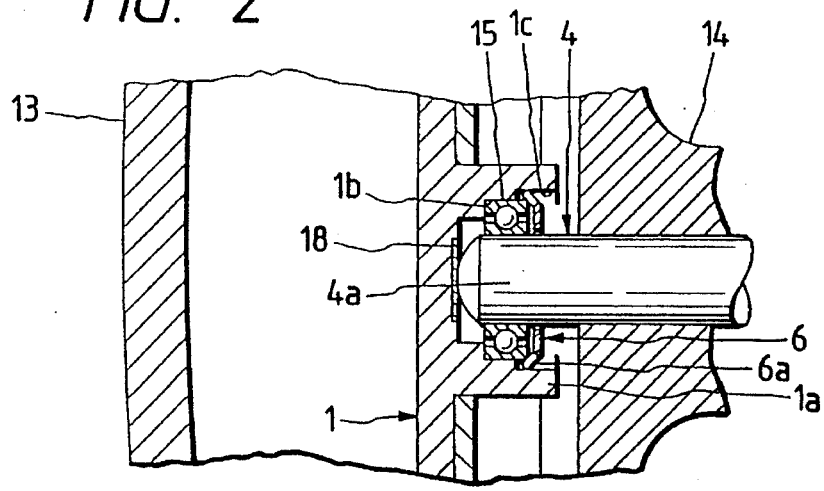
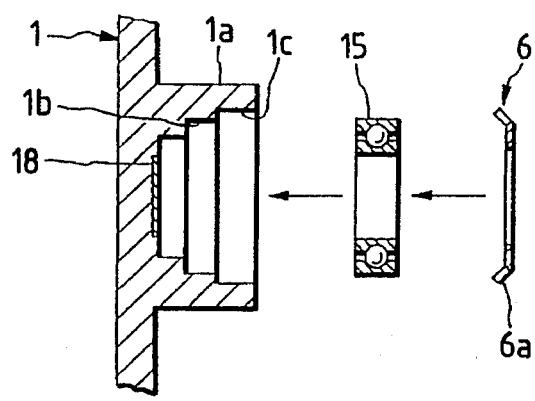
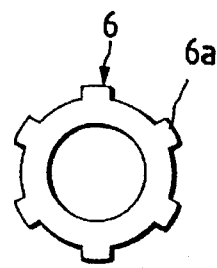
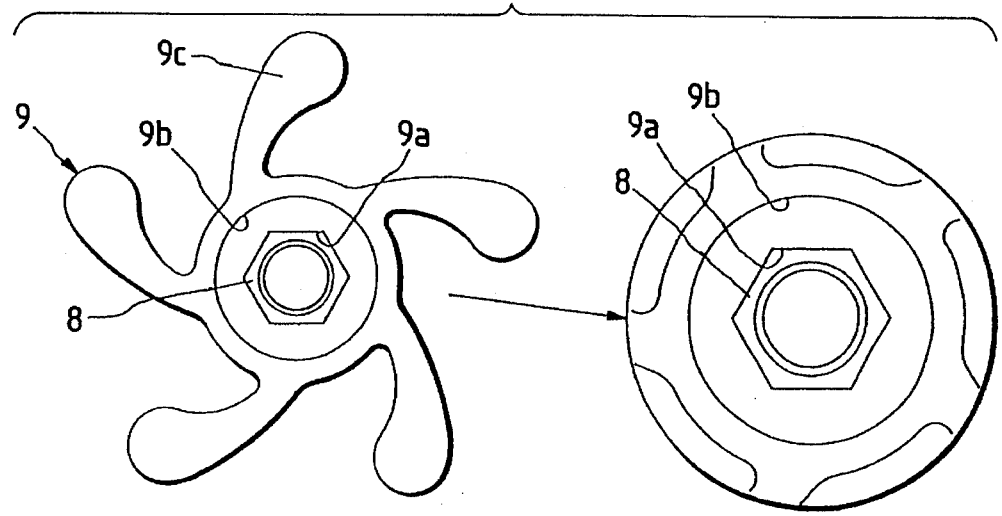

FISHING REEL BRAKE DEVICE

BACKGROUND OF THE INVENTION

This invention relates to a brake device in a fishing reel, and more specifically to an improvement of its adjuster which is adapted to adjust the braking force of a drive gear frictionally coupled to the handle shaft through a brake member which is applied to the spool.

A fishing reel having a brake device adapted to adjust the braking force of a drive gear applied to the spool which gear is frictionally coupled to the handle shaft through a brake member has been disclosed, for instance, by Japanese Utility Patent Application (OPI) No's 68774/1988 and 83069/1991 (the term "OPI" as used herein means an "unexamined application").

In the fishing reel, its adjuster adapted to push the brake member is threadably mounted directly on the handle shaft, or it is mounted through a nut on the handle shaft; that is, the nut is threadably engaged with the latter, and the adjuster is fixedly mounted on the nut thus engaged. The adjuster thus mounted is turned to push the brake member. Hence, if the force of pushing the brake member axially is weak, then the threaded parts become loose, so that the adjuster is unstably supported. In this case, it is impossible to smoothly and finely adjust the braking force.

Hence, a problem to be solved by the invention is that, if the force of pushing the brake member axially is weak, then the threaded parts become loose, so that the adjuster is unstably supported, which makes it impossible to smoothly and finely adjust the braking force.

SUMMARY OF THE INVENTION

In view of the foregoing, an object of the invention is to provide a brake device for a fishing reel in which an adjuster is supported without looseness, and is stably supported irrespective of the magnitude of braking force, which makes it possible to adjust the braking force finely.

The foregoing object of the invention has been achieved by the provision of a brake device for a fishing reel in which a handle shaft on the outer end portion of which a handle is mounted is rotatably supported by a reel body, a spool rotatably supported by the reel body can be turned in a line take-up direction by a drive gear which is frictionally coupled to the handle shaft through a brake member, and the braking force of the drive gear is adjusted by pushing the brake member with an adjuster which is mounted on the handle shaft in such a manner that the adjuster is movable back and forth. According to the invention, a nut member threadably engaged with the handle shaft is fixedly fitted in the adjuster in such a manner that the nut member is movable along the handle shaft, and the adjuster is rotatably supported through one side surface thereof on the side surface of the reel body.

As the adjuster is turned, the nut member is moved forwardly or backwardly. As the collar is pushed by the nut member thus moved, the brake member is pushed, so that the braking force is adjusted.

In the fishing reel, the adjuster is used to turn the nut member to push the brake member to adjust the braking force, and is rotatably supported on the reel side plate. Hence, the adjuster is free from looseness irrespective of the braking force.

In addition, no gap is formed between the reel side plate and the adjuster, and between the adjuster and the handle.

BRIEF DESCRIPTION OF THE DRAWINGS

FIG. 2 is an enlarged sectional view showing a left side frame and a reel side plate, and their relevant components in the double-bearing type fishing reel shown in FIG. 1.

FIG. 3A is an exploded sectional view of a bearing holding structure, and FIG. 3B is a front view a retaining member, in the double-bearing type fishing reel shown in FIG. 1.

Figure 1:
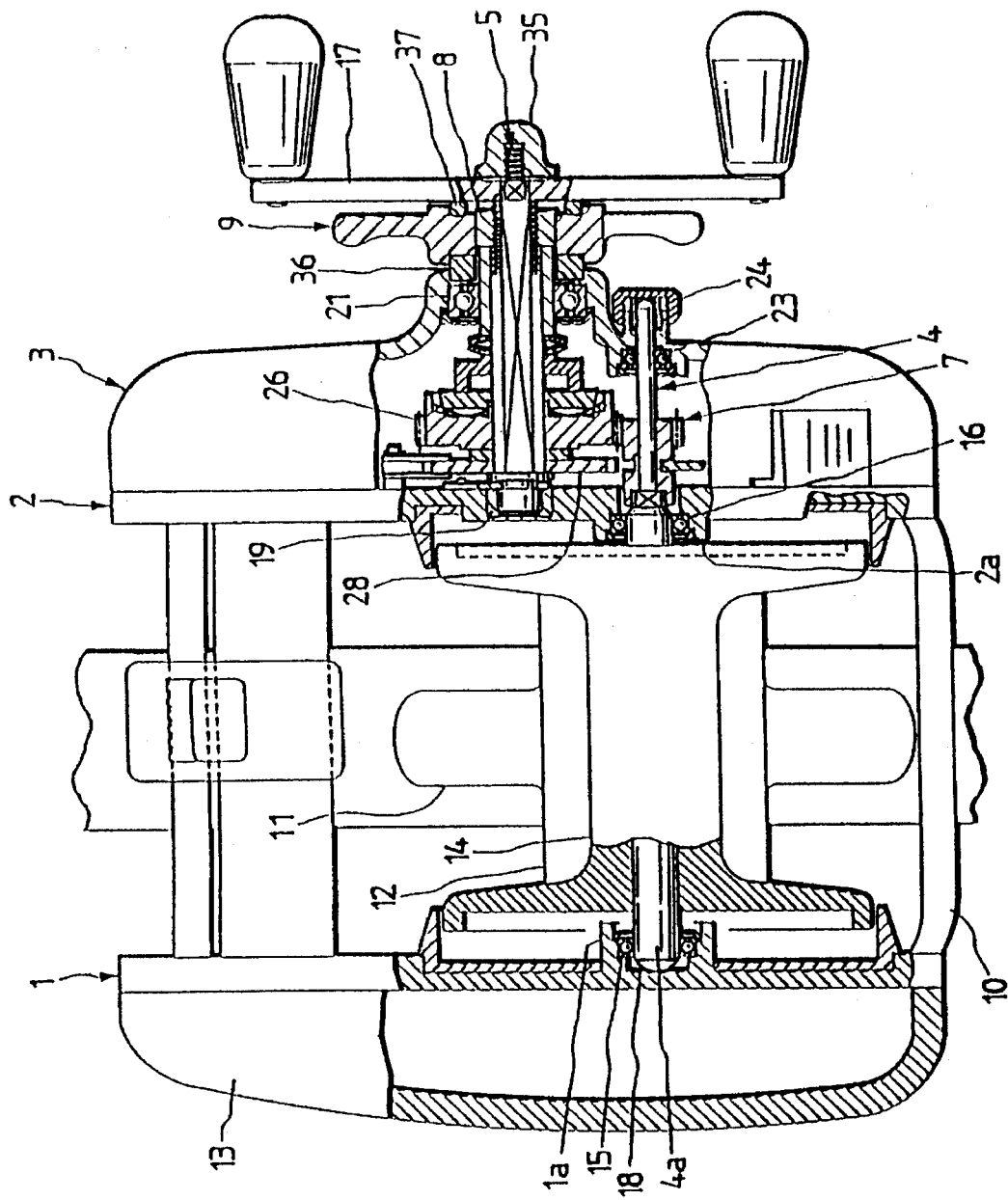
FIG. 1 is a plan view, with parts cut away, showing essential components of a double-bearing type fishing reel, which constitutes one embodiment of the invention.

The left part of FIG. 5 is a front view of an adjuster in the double-bearing type fishing reel shown in FIG. 1, and the right part is an enlarged front view showing a part of the adjuster.

Figure 6:
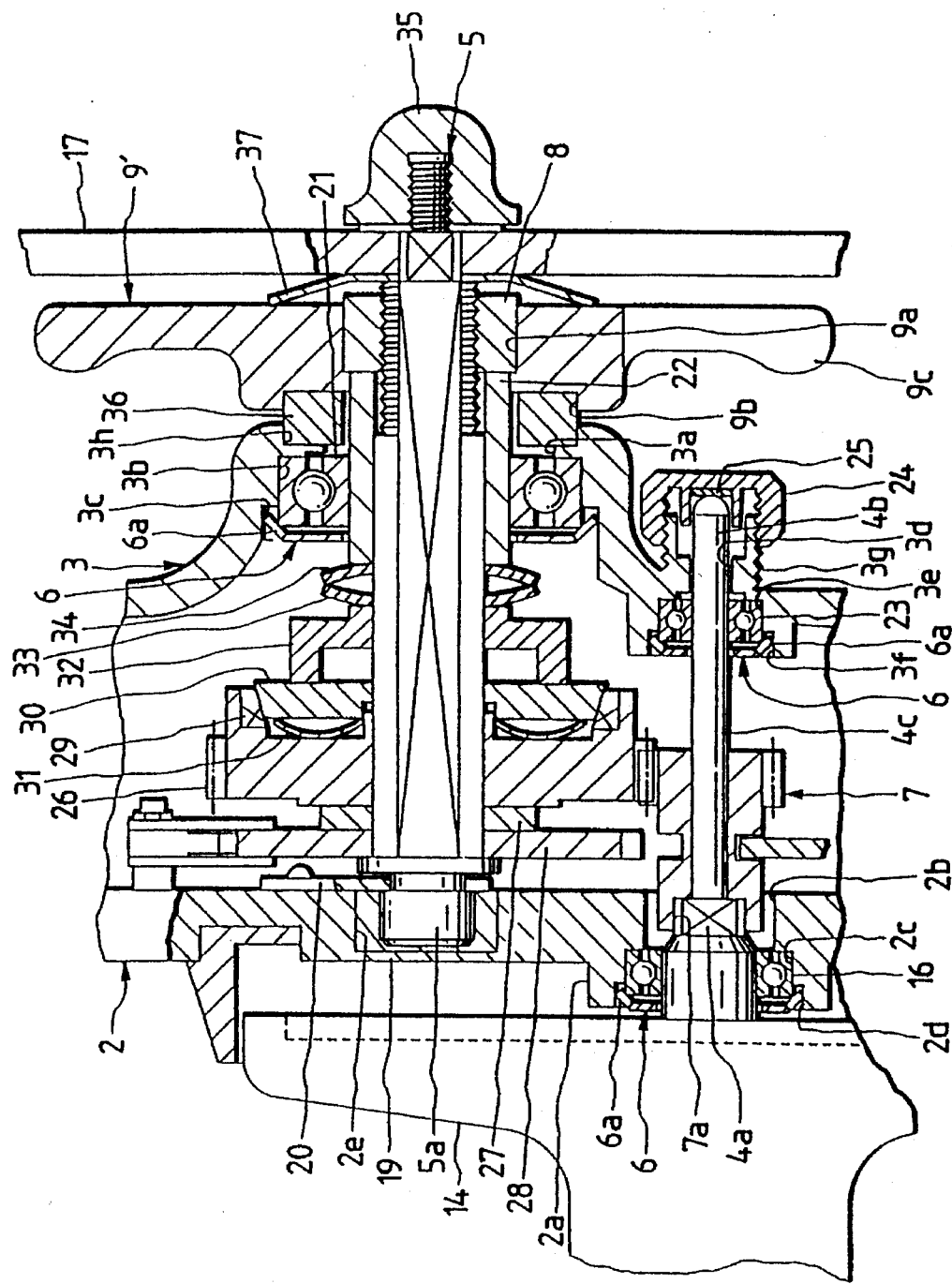

FIG. 6 is an enlarged plan view, with parts cut away, showing a right side frame and a reel side plate and their relevant components in one modification of the embodiment of the invention.

DETAILED DESCRIPTION OF THE PREFERRED EMBODIMENT

This invention will be described with reference to its preferred embodiment which is a double-bearing type fishing reel.

As shown in FIG. 1, the double-bearing type fishing reel comprises: right and left side frames 2 and 1 held in parallel with each other by a support 10 and the fixing plate 12 of a reel foot 11; and reel side plates 3 and 13 fixedly mounted on the right and left side frames 2 and 1, respectively.

A spool 14 is provided between the right and left side frames 2 and 1, and is mounted on a spool shaft 4 which includes a large-diameter shaft part and a small-diameter shaft part as described later. The spool shaft 4 is rotatably supported by a pair of bearings 15 and 16. The spool shaft 4 thus supported is turned through a clutch mechanism and a gear train mechanism with a handle 17 mounted on a handle shaft 5.

As shown in FIGS. 1 through 3, a cylindrical member 1a is extended inwardly from the inner surface of the left frame 1 to support the left end of the spool shaft 4 (hereinafter referred to as "a shaft cylinder 1a", when applicable).

The shaft cylinder 1a has an annular recess 1b, in which the aforementioned bearing 15 is fitted. One end portion 4a (of the large-diameter shaft part) of the spool shaft 4 is abutted through a thrust bearing 18 against the bottom of the shaft cylinder 1a.

The shaft cylinder 1a has another annular recess 1c along its opening which is larger in diameter than the recess 1b. Tongue pieces 6a of a retaining member 6 are engaged with the annular recess 1c to prevent the bearing 15 from coming off the shaft cylinder 1a.

Figure 4:
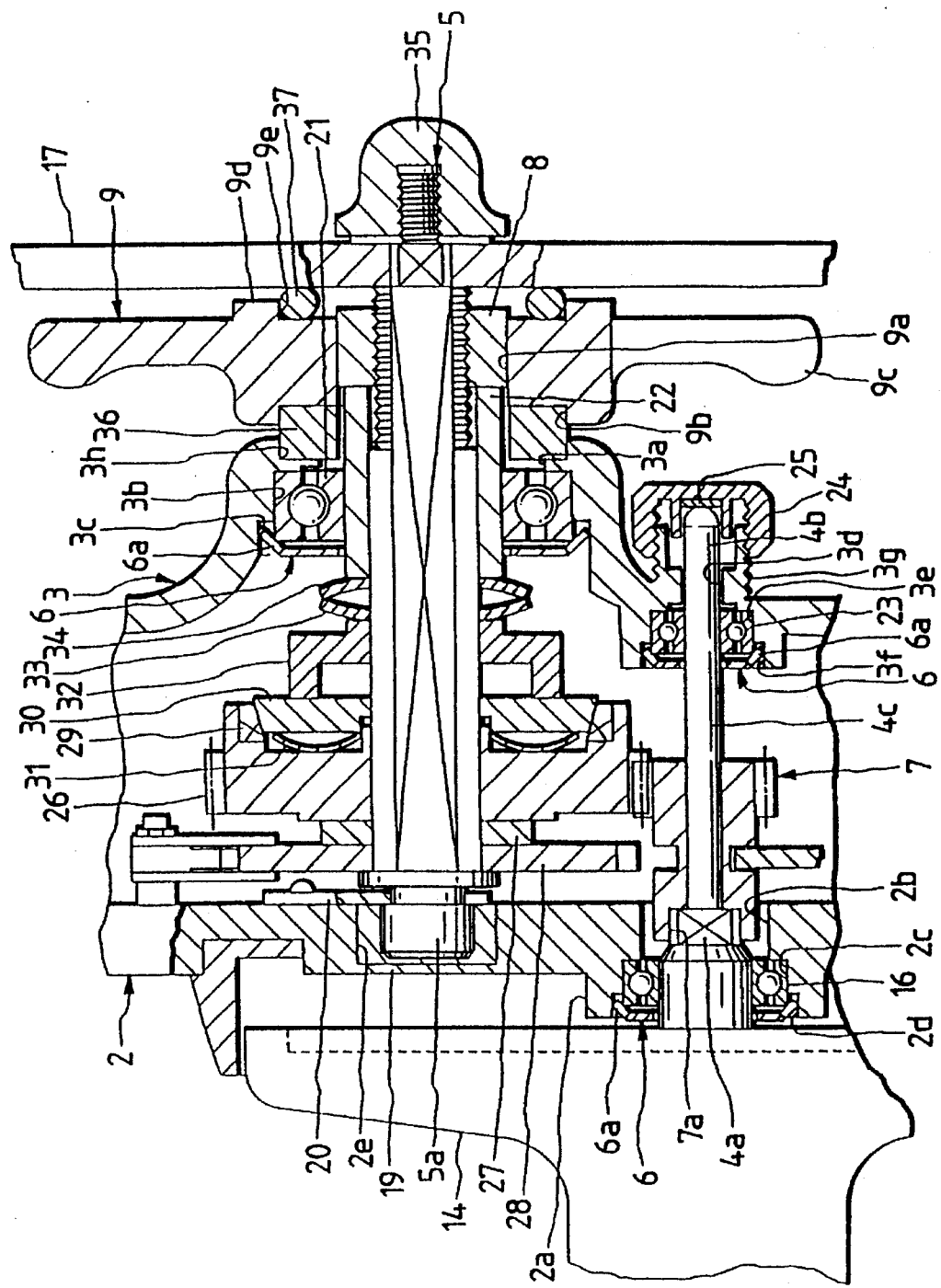
FIG. 4 is an enlarged plan view, with parts cut away, showing a right side frame and a reel side plate and their relevant components, in the double-bearing type fishing reel shown in FIG. 1.

The right side frame 1 also, as shown in FIGS. 1 and 4, has a shaft cylinder 2a extended inwardly from its inner surface. The shaft cylinder 2a has a through-hole 2b, and annular recesses 2c and 2d.

The aforementioned bearing 16 is fitted in the annular recess 2c, and the tongue pieces 6a of another retaining member 6, which is similar in configuration to the above-described one, are engaged with the recess 2d to prevent the bearing 16 from coming off the shaft cylinder 2a.

The right side frame 2 has a recess 2e in its right surface, in which a bearing 19 is fitted. The end portion 5a of the aforementioned handle shaft 5 is rotatably fitted in the recess 2e, and a retaining plate 20 is engaged with the end portion 5a of the handle shaft 5 to prevent the latter 5 from coming off the recess 2e.

The reel side plate 3 has a through-hole 3a, and annular recesses 3b and 3c.

A bearing 21 is fitted in the recess 3b, and the tongue pieces 6a of a retaining member 6, which is similar in configuration to the above-described one, are engaged with the recess 3c to prevent the bearing 21 from coming off the reel side plate 3.

The handle shaft 5 is rotatably supported through a collar 22 by the bearing 21 thus fitted. The collar 22 is movable along the handle shaft 5 but not rotatable relative to the latter 5.

The reel side plates 3 further includes a throughhole 3d and annular recesses 3e and 3f.

A bearing 23 is fitted in the recess 3e, and the tongue pieces 6 of a retaining member 6, which is similar in configuration to the above-described one, are engaged with the recess 3f to prevent the bearing 23 from coming off the reel side plate 3.

The bearing 23 supports the outer end portion 4b of the small-diameter shaft part of the spool shaft 4.

The reel side plate 3 has a shaft cylinder 3g protruded from its right surface whose outer cylindrical surface is male-threaded.

A cup-shaped cover 24 is threadably engaged with the shaft cylinder 3g, so that the other end portion 4b of the spool shaft 4 is abutted against the bottom of the cup-shaped cover 24 through a thrust bearing 25.

A pinion 7 is provided between the right side frame 2 and the reel side plate 3 in such a manner that it is mounted on the small-diameter shaft part 4c of the spool shaft 4 and is axially movable. The engaging portion 4d of the spool shaft 4 and the engaging portion 7a of the pinion 7 forms a clutch mechanism.

The pinion 7 is threadably engaged with a drive gear 26 which is rotatably mounted on the handle shaft 5.

On the left side of the drive gear 26, a friction board 27 is mounted on the handle shaft 5, and a ratchet wheel 28 is provided on the left side of the friction board 27. More specifically, the ratchet wheel 28 is mounted on the handle shaft 5 in such a manner that it is not rotatable around the latter 5.

A friction board 29 is fixedly secured to the right surface of the drive gear 26, and a friction disk 30 is abutted against the friction board 29. The friction disk 30 is mounted on the handle shaft 5 in such a manner that it is not rotatable around the latter 5.

A curved spring 31 is interposed between the drive gear 26 and the friction board 30.

A pushing board 32 is mounted on the handle shaft 5 in such a manner that it is abutted against the right surface of the friction disk 30 and it is not rotatable around the handle shaft 5.

Springs 33 and 34 are fixedly mounted on the handle shaft 5 in such a manner that they are abutted against the right surface of the pushing board 32 and they are not rotatable around the handle shaft 5.

The aforementioned collar 22 is abutted against the right surface of the spring 34.

A nut member 8 threadably engaged with the handle shaft 5 is abutted against the right end face of the collar 22.

On the right side of the nut member 8, a handle 17 is mounted on the handle shaft 5 in such a manner that it is not rotatable around the latter 5. A nut 35 is engaged with the end portion of the handle shaft 5 to prevent the handle 17 from coming off the latter 5.

The friction board 29, the friction disk 30, the curved spring 31, the pushing board 32, the springs 33 and 34, and the collar 22 form a brake member.

The aforementioned nut member 8 is fitted in a polygonal through-hole 9a formed in an adjuster 9 in such a manner that it is movable axially.

An intermediate member 36 is interposed between the adjuster 9 and the reel side plate 3. The intermediate member 36 is made of metal, hard material such as synthetic resin, or hard felt. Another intermediate member 37, which is an O-ring, is interposed between the adjuster 9 and the handle 17.

The intermediate member 36 is rotatably fitted in a recess 3h which is formed in the right surface of the reel side plate 3 on the right side of the bearing 21 supporting the handle shaft 5.

The brake member coupled to the handle shaft 5, and the nut member 8 threadably engaged with the handle shaft 5, and the adjuster 9 form a brake device.

The adjuster 9, as shown in FIGS. 1, 4 and 5, has a polygonal through-hole 9a, and a recess 9b in the left surface (on the side of the reel side plate 3), and operating arms 9c which are turned with the fingers. The adjuster 9 further has a protrusion 9d on the right surface (on the side of the handle 17) which defines a recess 9e.

The aforementioned intermediate member 36 is rotatably fitted in the recess 9b of the adjuster 9, and the other intermediate member 37 is fitted in the recess 9e of the adjuster 9. Thus, the adjuster 9 is supported by three components: the nut member 8 threadably engaged with the handle shaft 5, the intermediate member 36 fitted in the reel side plate 3, and the intermediate member 37 interposed between the adjuster 9 and the handle 17.

The nut member 8 is a conventional one which is commercially available.

The double-bearing type fishing reel is constructed as described above. Hence, as the handle 17 is turned, the spool shaft 4 and the spool 14 are turned through the handle shaft 5 and the gear train mechanism.

The braking force of the drive gear 26 which is frictionally coupled to the handle shaft 5 through the brake member can be adjusted by turning the adjuster 9.

That is, as the adjuster 9 is turned, the nut member 8 is moved forwardly or backwardly. As the collar 22 is pushed by the nut member 8 thus moved, the brake member is pushed, so that the braking force is adjusted.

In the fishing reel, the adjuster 9, which is used to turn the nut member 8 to push the brake member to adjust the braking force, is rotatably supported on the reel side plate 3. Hence, the adjuster 9 is free from looseness irrespective of the braking force.

In addition, no gap is formed between the reel side plate 3 and the adjuster 9, and between the adjuster 9 and the handle 17.

In the brake device thus constructed, the brake force is adjusted in the above-described manner. Hence, the adjuster 9 is supported without looseness, and is stably supported irrespective of the braking force, which makes it possible to adjust the braking force finely.

Furthermore, sea water, sand or dust will never stick onto the handle shaft 5 nor enter the fishing reel through the reel side plate 3. That is, the fishing reel is prevented from being adversely affected by sea water, sand or dust. With the fishing reel, the braking force can be smoothly adjusted at all times.

FIG. 6 shows one modification of the above-described embodiment of the invention. FIG. 6 is an enlarged sectional plan view showing a right side frame and a reel side plate and their relevant components in the modification.

The modification is different from the first embodiment only in the following points:

As shown in FIG. 6, an intermediate member 37 which is a leaf spring is interposed between an adjuster 9' and the handle 17.

The left surface (on the side of the handle 17) of the adjuster 9' is flat.

In the above-described embodiment the O-ring is employed as the intermediate member 37, and in the modification the leaf spring is employed as the intermediate member 37; however, the invention is not limited thereto or thereby. That is, they may be made of hard felt, or they may be replaced with elastic members such as trapezoid coil springs.

In addition, the intermediate member 36 may be a ball bearing, or a synthetic resin bearing; and the intermediate member 37 may be of hard material.

While the invention has been described with reference to the double-bearing type fishing reel, the technical concept of the invention may be applied to fishing reels of other types.

Furthermore, the brake device may be formed by combining components different in configuration from those which have been described.

The brake device of the invention is designed as described above. That is, the adjuster adapted to turn the nut member to push the brake member thereby to adjust the braking force is rotatably supported on the reel side plate. Hence, the adjuster is supported without looseness, and is stably supported irrespective of the braking force, which makes it possible to finely adjust the braking force.

Furthermore, in the fishing reel, no gap is formed between the reel side plate and the adjuster and between the adjuster and the handle. That is, sea water, sand or dust will never stick onto the handle shaft nor enter the fishing reel. That is, the fishing reel is prevented from being adversely affected by sea water, sand or dust. With the fishing reel, the braking force can be smoothly adjusted at all times. Those effects of the invention should be highly appreciated in practical use.

What is claimed is:

1. A brake device in a fishing reel having a reel body; a handle shaft having a handle and rotatably supported by said reel body; and a drive gear for turning a spool rotatably supported by said reel body in a line take-up direction, said drive gear being rotatably supported on said handle shaft and at least partially enclosed within said reel body by side plates oppositely disposed with respect to said spool, said brake device comprising:

a coupling means for frictional coupling said drive gear to said handle shaft, said coupling means having a brake member non-rotatably fitted on said handle shaft and depressed against said drive gear to produce a frictional force;

an adjuster rotatably supported by said reel body between said handle and one of said side plates for adjusting the frictional force;

support means for rotatably supporting the adjuster on the reel body, said support means contiguous with and interposed between said adjuster and said one of said side plates, said support means thereby extends from said reel body to said adjuster to remove looseness of said adjuster irrespective of said frictional force; and a nut member threadingly engaged with said handle shaft and movably, non-rotatably fitted in said adjuster, and wherein:

when said adjuster is rotated relative to said handle shaft, said nut member is moved along an axial direction of said handle shaft relative to said adjuster to vary the depression of said brake member against said drive gear, while said adjuster is maintained in a substantially fixed position along said axial direction of said handle shaft.

2. A brake device according to claim 1, wherein said support means comprises:

an intermediate member interposed between said adjuster and said handle for preventing said adjuster from being axially moved relative to said handle shaft.

3. A brake device according to claim 1, further comprising:

a first member interposed between said adjuster and said handle;

wherein said adjuster is rotatably and non-translatably held between said reel body and said handle through said first member and said support means.

* * * * *